(12) United States Patent  
Alex et al.

(10) Patent No.: US 8,229,422 B2  
(45) Date of Patent: Jul. 24, 2012

(54) METHOD AND APPARATUS TO FACILITATE BROADCAST PACKET HANDLING

(75) Inventors: Arun C. Alex, Bartlett, IL (US); Kunnath Sudhir, Bolingbrook, IL (US)

(73) Assignee: UTStarcom, Inc., Alameda, CA (US)

( * ) Notice: Subject to any disclaimer, the term of this patent is extended or adjusted under 35 U.S.C. 154(b) by 152 days.

(21) Appl. No.: 12/643,876

(22) Filed: Dec. 21, 2009

(65) Prior Publication Data

US 2010/0097975 A1  Apr. 22, 2010

Related U.S. Application Data

(63) Continuation of application No. 11/034,614, filed on Jan. 13, 2005, now Pat. No. 7,660,582.

(51) Int. Cl.
*H04W 4/00* (2009.01)
*H04H 20/71* (2008.01)

(52) U.S. Cl. ........................ 455/433; 370/312

(58) Field of Classification Search ........... 370/230, 370/231, 235, 312
See application file for complete search history.

(56) References Cited

U.S. PATENT DOCUMENTS

| | | | |
|---|---|---|---|
| 6,445,922 B1* | 9/2002 | Hiller et al. | 455/433 |
| 2002/0039367 A1* | 4/2002 | Seppala et al. | 370/401 |
| 2002/0057657 A1* | 5/2002 | La Porta et al. | 370/331 |
| 2003/0018715 A1 | 1/2003 | O'Neill | |
| 2004/0032844 A1 | 2/2004 | Lewis et al. | |
| 2005/0079869 A1* | 4/2005 | Khalil et al. | 455/435.1 |
| 2005/0083868 A1* | 4/2005 | Idnani et al. | 370/312 |

OTHER PUBLICATIONS

Conversation thread: http://ftp.betnet.be/pub/mirror/ftp.ietf.org/ietf-mail-archive/mobileip/1995-04, [online], retrieved online on Oct. 8, 2004, 46 pages.
Perkins, C., RFC2002-IP, Mobility Support,(Network Working Group), 2002,[retrieved online on May 17, 2005], Retrieved from the internet URL>http://www.faqs.org/faqs, 73 pages.
Office Action for U.S. Appl. No. 11/034,614, mailed Aug. 9, 2007.
Final Office Action for U.S. Appl. No. 11/034,614, mailed Jan. 29, 2008.
Office Action for U.S. Appl. No. 11/034,614, mailed Sep. 8, 2008.
Final Office Action for U.S. Appl. No. 11/034,614, mailed May 12, 2009.
Notice of Allownce for U.S. Appl. No. 11/034,614, mailed Sep. 18, 2009.
Response to Rule 312 Communication for U.S. Appl. No. 11/034,614, mailed Jan. 5, 2010.

* cited by examiner

*Primary Examiner* — Nick Corsaro
*Assistant Examiner* — Joel Ajayi
(74) *Attorney, Agent, or Firm* — Schwabe, Williamson & Wyatt, P.C.

(57) ABSTRACT

A first network element determines (11) that a given mobile node using mobile Internet Protocol should receive subsequent broadcast packets as may be sourced by a corresponding Home Agent. This first network element can then determine (12) whether to support such subsequent broadcast packets using a first broadcast packet handling approach or a second broadcast packet handling approach.

20 Claims, 3 Drawing Sheets

METHOD AND APPARATUS TO FACILITATE BROADCAST PACKET HANDLING

CROSS REFERENCE TO RELATED APPLICATION

The present application is a continuation of and claims the benefit under 35 U.S.C. §120 to U.S. patent application Ser. No. 11/034,614, entitled "METHOD AND APPARATUS TO FACILITATE BROADCAST PACKET HANDLING," filed Jan. 13, 2005, assigned to the same assignee as the present application, and which is incorporated herein by reference in its entirety.

TECHNICAL FIELD

This invention relates generally to Internet Protocol-based broadcast packets.

BACKGROUND

The Internet and its enabling protocols are well known. This includes support for so-called broadcast packets (such as, but not limited to, emergency notifications, system control packets, and so forth). In particular, the present Internet Protocol provides a mechanism whereby, for example, a Home Agent can send a given packet to a number of different recipients (hence the moniker "broadcast").

At present, a Mobile Internet Protocol node that wishes to receive broadcast packets from its Home Agent will send a Mobile Internet Protocol registration request message with its "B" bit set. The serving Packet Data Serving Node for this Mobile Internet Protocol node will then forward this request to the Home Agent and service the Home Agent's response as well. Later, when a broadcast packet arrives at the Home Agent for further distribution, the latter will encapsulate the broadcast packet in a unicast datagram and tunnel this encapsulated datagram to the Packet Data Serving Node. The Packet Data Serving Node will then decapsulate this message and forward it to the Mobile Internet Protocol node.

If, however, multiple Mobile Internet Protocol nodes as are served by this Packet Data Serving Node/Home Agent pair request the forwarding of broadcast packets, the same broadcast packet will be sent over several different Mobile Internet Protocol tunnels from the Home Agent to the Packet Data Serving Node. In turn, each of these identical but individual broadcast packets is then forwarded on by the Packet Data Serving Node to the respective Mobile Internet Protocol nodes.

Such an approach, while successful in the sense of accomplishing the desired end result of facilitating the distribution of broadcast packets, nevertheless leaves much to be desired. In particular, this approach tends to result in a considerable volume of traffic between the Home Agent and Packet Data Serving Node.

BRIEF DESCRIPTION OF THE DRAWINGS

The above needs are at least partially met through provision of the method and apparatus to facilitate broadcast packet handling described in the following detailed description, particularly when studied in conjunction with the drawings, wherein.

Skilled artisans will appreciate that elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. It will also be understood that the terms and expressions used herein have the ordinary meaning as is accorded to such terms and expressions with respect to their corresponding respective areas of inquiry and study except where specific meanings have otherwise been set forth herein.

DETAILED DESCRIPTION

Generally speaking, pursuant to these various embodiments, a first network element makes a determination regarding whether a given mobile node using mobile Internet Protocol should receive subsequent broadcast packets as are sourced by a corresponding Home Agent, and then makes an automatic determination regarding whether to support such subsequent broadcast packets using a first broadcast handling approach or a second broadcast packet handling approach.

In a preferred approach the first network element comprises a Packet Data Serving Node.

Also pursuant to a preferred embodiment, the first broadcast handling approach comprises having the Home Agent transmit a discrete version of each subsequent broadcast packet to each mobile station as is supported by the first network element, and the second broadcast packet handling approach comprises having the Home Agent transmit a shared version of each subsequent broadcast packet to each mobile station as is supported by the first network element.

So configured, these teachings when employed typically effect considerably improved bandwidth utilization of the Home Agent to Packet Data Serving Node link when supporting broadcast packets. In particular, these teachings tend to minimize (or at least reduce) the data traffic that is sent from the Home Agent to the Packet Data Serving Node when several mobile nodes as are served by this Home Agent/Packet Data Serving Node pair have all requested the forwarding of broadcast packets. This, in turn, aids in reducing data network congestion.

Figure 1:
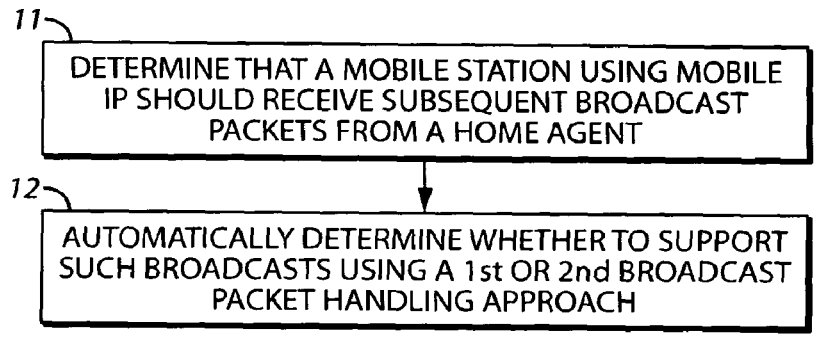
FIG. 1 comprises a flow diagram as configured in accordance with various embodiments of the invention.

These and other benefits may become clearer upon making a thorough review and study of the following detailed description. Referring now to the drawings, and in particular to FIG. 1, a general process 10 in accord with these teachings will first provide for a determination 11 (at a first network element such as, but not limited to, a Packet Data Serving Node) that a given mobile node using mobile Internet Protocol should receive subsequent broadcast packets as are sourced by a corresponding Home Agent. This determination can comprise, for example, receiving a message at the first network element as sourced by the given mobile node and then determining that this message comprises an indication that broadcast packets should be transmitted to the given mobile node.

As but one illustrative example, this can comprise a message having a set mobile Internet Protocol "B" bit in accordance with well-understood prior art practice.

This process 10 then provides for automatically determining 12 whether to support such subsequent broadcast packets using a first broadcast packet handling approach or a second broadcast packet handling approach. In a preferred scheme the first broadcast packet handling approach comprises having the Home Agent transmit a discrete version of each subsequent broadcast packet to each mobile station as is supported by the first network element. This scheme can be realized, for example, by use of present broadcast packet handling in this regard. The second broadcast packet handling approach can then preferably comprise having the Home Agent transmit a shared version of each subsequent broadcast packet to each mobile station as is supported by the first network element. This second approach, of course, avoids discrete transmissions of each of a plurality of packets that are essentially (or exactly) identical to one another, as now a multitude of intended recipients effectively share a single conveyance of the content to the network element from the Home Agent.

This determination can be effected in a variety of ways. Pursuant to one approach, the first network element conducts negotiations with the Home Agent regarding the handling of broadcast packets. For example, the first network element can indicate to the Home Agent that the first network element is able to support the second broadcast packet handling approach (when, of course, the network element is in fact able to support such handling). If the Home Agent is also able to support the second broadcast packet handling approach, then the Home Agent and the first network element can thereafter use the second broadcast packet handling approach when sending subsequent broadcast packets to the given mobile node.

When the Home Agent is not able to support the second broadcast packet handling approach, the Home Agent can instead indicate this circumstance to the first network element (for example, by indicating that the Home Agent will support using the first broadcast packet handling approach) and thereafter the Home Agent and the network element can use the first broadcast packet handling approach.

Figure 2:
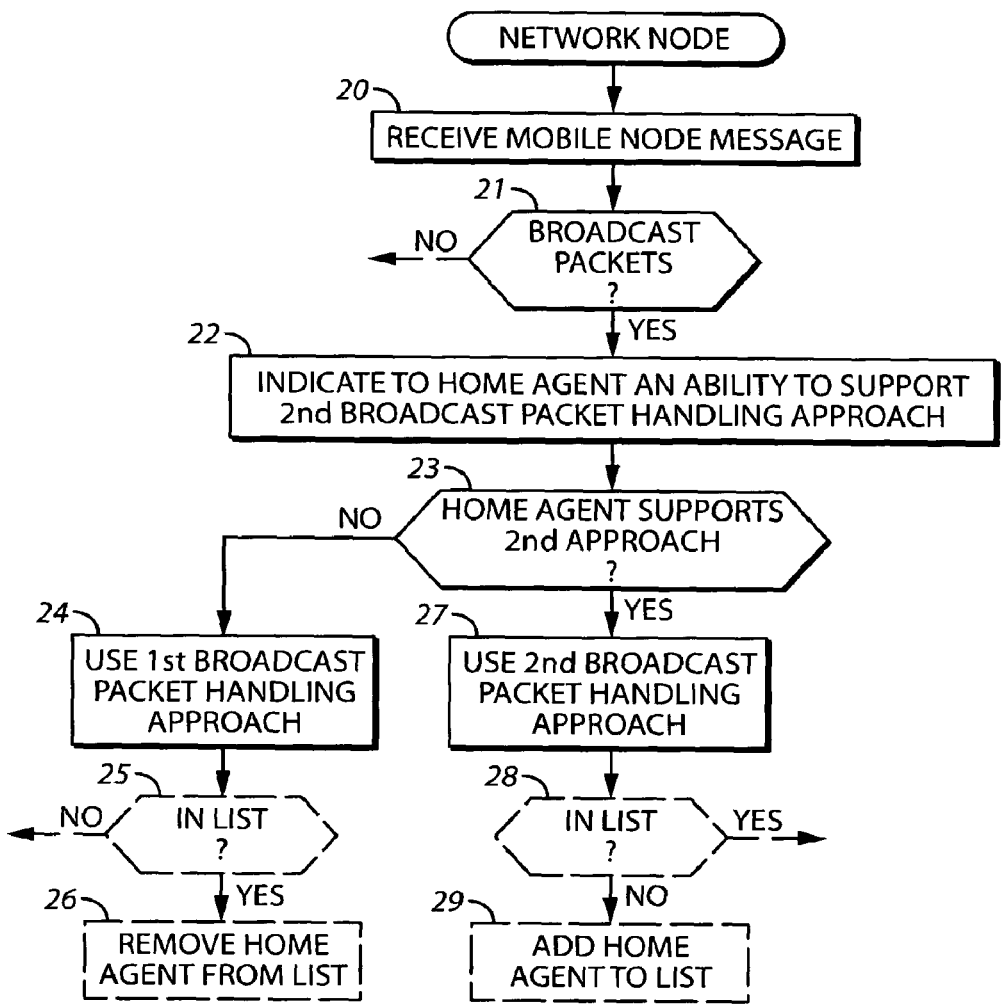
FIG. 2 comprises a flow diagram as configured in accordance with various embodiments of the invention.

Referring now to FIG. 2, a network node (such as, but not limited to, a Packet Data Serving Node) can support the above-described process 10 by, when receiving 20 a message as was sourced by a given mobile node, then determining 21 whether that message comprises an indication that broadcast packets should be transmitted to the given mobile node (for example, by ascertaining that the message comprises, at least in part, a set mobile Internet Protocol "B" bit). When not true, the network node can continue in accordance with its ordinary and usual programmed processing as will be well understood by those skilled in the art. When true, however, the network node can then indicate 22 to the Home Agent that it (i.e., the first network element) is able to support the second broadcast packet handling approach.

This indication comprises but one way that such a network node can initiate a negotiation with the Home Agent regarding whether the first or second broadcast packet handling approach should be subsequently employed. By the present approach, the network node then determines 23 whether the Home Agent will support subsequent use of the second broadcast packet handling approach.

When false (meaning that the Home Agent is unable or unwilling to support the second approach), the network node can use the first broadcast packet handling approach when sending subsequent broadcast packets to the given mobile node. (This selection can occur in various ways, including because the first approach comprises a default approach and/or because the Home Agent has previously specified use of the first approach.) As an optional though useful step, the network node can then also determine 25 whether the Home Agent is presently in a list maintained (and/or accessed) by the network node, which list identifies Home Agents that are able to support the second broadcast packet handling approach. When false, the process can essentially conclude. When true, however, the network node can remove 26 the Home Agent from that list.

When the Home Agent is in fact able to support the second broadcast packet handling approach, the network node can instead thereafter use 27 the second broadcast packet handling approach when sending subsequent broadcast packets to the given mobile node. Again, as an optional though useful step, the network node can also determine 28 whether the Home Agent is identified in its list of Home Agents that support the second approach. When not true, the network node can cause the inclusion 29 of the Home Agent in that list. In addition, if desired, the network node can also associate the given mobile node with that Home Agent in the list.

Figure 3:
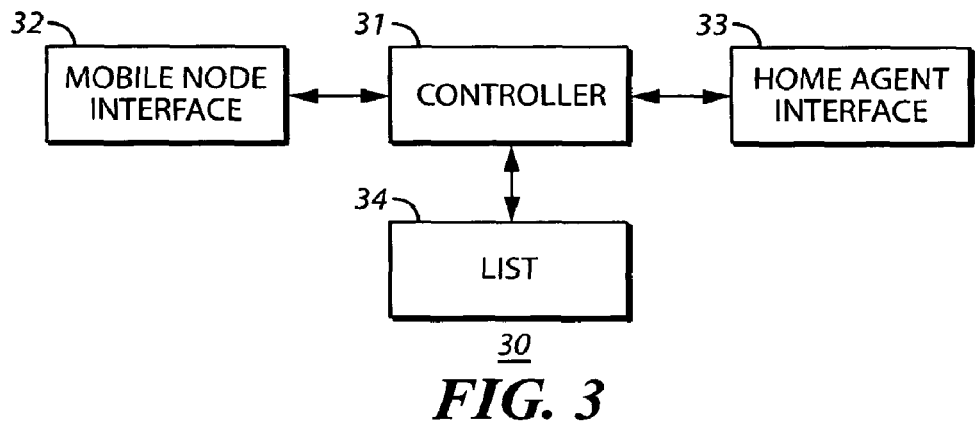
FIG. 3 comprises a block diagram as configured in accordance with various embodiments of the invention.

Referring now to FIG. 3, such a network element 30 can be generally comprised of a controller 31 that operably couples to a mobile node interface 32, a Home Agent interface 33, and a list 34. The mobile node interface 32 preferably effects an interface to a mobile Internet Protocol-compatible wireless mobile node. Such interfaces as are indicated above are well known and understood in the art. Therefore, for the sake of brevity and the preservation of narrative focus, further elaboration need not and will not be presented here.

The list 34 preferably indicates whether the network element 30 is to use a first broadcast packet handling approach or a second broadcast packet handing approach when forwarding broadcast packets from a given Home Agent (via the Home Agent interface 33) to a given mobile node (or nodes) (via the mobile node interface 32). This list 34 can be stored, for example, in one or more corresponding memories. Such memory can be local or remote and can be shared or dedicated as will be well appreciated by those skilled in the art. In a preferred embodiment, this list comprises more particularly a list of Home Agents that support the second broadcast packet handling approach and, optionally but again preferably, a list of mobile nodes as are associated with each of the Home Agents in this list.

The controller 31 is preferably configured and arranged to source, when appropriate, signaling to the Home Agent (via the Home Agent interface 33) that the network element 30 supports the above-mentioned second broadcast packet handling approach. This controller 31 is also preferably configured and arranged to receive (and process accordingly) a signal from the Home Agent (via the Home Agent interface 33) indicating that the Home Agent supports (or does not support) the second broadcast packet handling approach. So configured, the network element is well poised to support and facilitate the earlier-described processes.

Network elements such as Packet Data Serving Nodes are well known in the art and typically comprise partially or largely programmable platforms. Those skilled in the art will therefore appreciate that such a platform can be readily programmed to serve as the above-described controller 31, either as a dedicated capability or, more likely, as a shared enabling resource for other supported capabilities as well.

Figure 4:
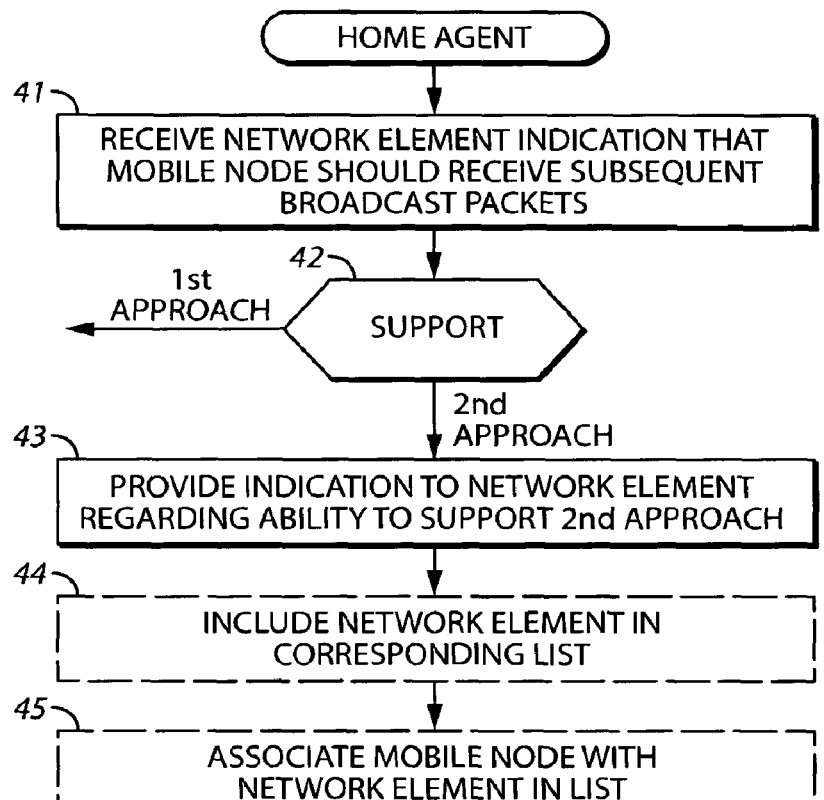
FIG. 4 comprises a flow diagram as configured in accordance with various embodiments of the invention.

Referring now to FIG. 4, a Home Agent can support these teachings via its own facilitating process. More particularly, upon receiving 41 an indication from a first network element that a given mobile node using mobile Internet Protocol should receive subsequent broadcast packets as may be sourced by the Home Agent, the Home Agent then automatically determines 42 whether to support such subsequent broadcast packets using a first broadcast packet handling approach or a second broadcast packet handling approach. The noted received indication can comprise, for example, reception of a registration request that indicates that subsequent broadcast packets are to be sent to the specified mobile node.

The above-noted determination 42 can comprise, for example, determining whether such a registration request comprises an indication that the first network element itself supports the second broadcast packet handling approach. This indication can be any suitable indication as may best comport with the capabilities and/or limitations of a given setting. As but one illustrative example, this indication can comprise at least one normal vendor specific extension (NVSE) that itself is understood to comprise an indication that the sourcing network element supports the second broadcast packet handling approach. The use of such extensions for unique specific purposes is generally well understood in the art.

When the Home Agent determines 42 to use the first broadcast packet handling approach, the Home Agent may then essentially utilize an existing process to effect the sourcing of one-on-one packets to individual mobile nodes when supporting a general broadcast. Again, such processes are known in the art and require no further description here.

When the Home Agent determines 42 to use the second broadcast packet handling approach, the Home Agent will then preferably provide 43 an indication to the first network element that the Home Agent is, in fact, also able to support the second broadcast packet handling approach. This indication can take a variety of forms with a specific form being selected in a given instance to best accommodate the needs and/or limitations as characterize that given instance.

Optionally but preferably, the Home Agent will also include 44 the first network element in a corresponding list and will further associate 45 the given mobile node with that first network element via that list as well. So configured, the Home Agent will have an increased depth of information regarding when and how to effect subsequent usage of the second broadcast packet handling approach, which information can be leveraged to useful effect in various ways as desired.

Figure 5:
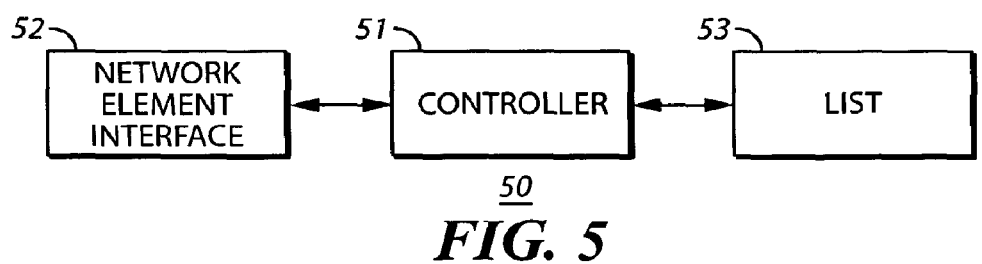
FIG. 5 comprises a block diagram as configured in accordance with various embodiments of the invention.

Referring now to FIG. 5, a Home Agent 50 will preferably comprise a controller 51 that operably couples to a network element interface 52 and a list 53 such as that noted above. More particularly, this list 53 can comprise indications regarding whether to use a first or second broadcast packet handling approach when forwarding broadcast packets to a mobile node (or nodes) via a given network element (and hence may comprise a list of network elements that support the second broadcast packet handling approach and, preferably, those mobile nodes as are associated with each of the listed network elements). As with the network element described above, this list 53 can be stored or otherwise retained using any desired storage strategy including local or remote facilities, dedicated or shared facilities, and/or central or distributed facilities. Such architectural options are well understood by those skilled in the art.

In a preferred embodiment, the controller 51 is configured and arranged to support receiving a signal from a network element indicating that the network element supports the second broadcast packet handling approach and transmitting a signal to the network element indicating that the Home Agent itself supports the second broadcast packet handling approach. So configured, the Home Agent can readily support the various teachings set forth above.

Home Agents are well known in the art and typically comprise partially or largely programmable platforms. Those skilled in the art will therefore appreciate that such a platform can be readily programmed to serve as the above-described controller 51, either as a dedicated capability or, more likely, as a shared resource.

Figure 6:
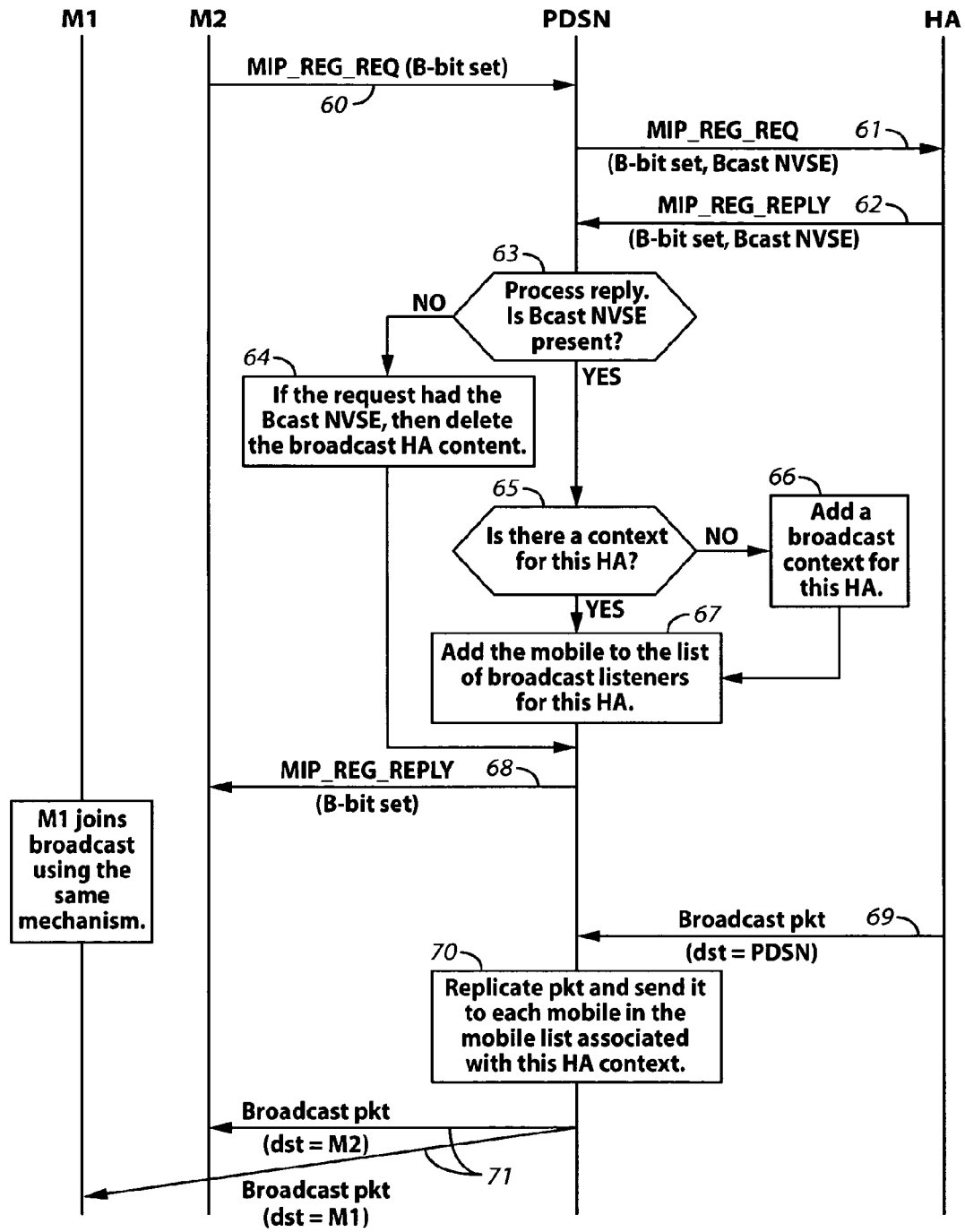
FIG. 6 comprises a signal flow diagram as configured in accordance with various embodiments of the invention.

Referring now to FIG. 6, an illustrative example will be provided. In this example, a mobile node (M2) transmits a registration request 60 to a Packet Data Serving Node (this request comprising particularly, in this example, an MIP_REG_REQ wherein the "B" bit of this request has been set). This request serves, at least in part, to indicate a desire to receive future broadcast packets as may be issued by the Home Agent (HA).

Recognizing the nature of this request, the Packet Data Serving Node then transmits a registration request 61 on behalf of the mobile node to the Home Agent. This registration request 61, however, also includes an indication that the Packet Data Serving Node can support a shared version broadcast packet handling approach. (More particularly, in this example, the registration request 61 comprises an MIP_REG_REQ where the "B" bit has been set and further comprises a corresponding broadcast NVSE that specifies this capability of the Packet Data Serving Node.)

In this illustrative example, the Home Agent is itself capable of also supporting the shared version broadcast packet handling approach and therefore returns to the Packet Data Serving Node a reply message 62 that, in addition to confirming that future broadcast packets will be sent to the mobile node, also confirms that the Home Agent can and will support such broadcast packets through use of the indicated handling approach. (In this illustrative example, this reply message 62 comprises an MIP_REG_REPLY having a set "B" bit and further comprising a broadcast NVSE portion that signals to the Packet Data Serving Node the above indicated confirmation and status.)

The Packet Data Serving Node then processes this reply message 62 to determine 63 whether the Home Agent will support the shared version broadcast packet handling approach. More particularly, in this illustrative example, the Packet Data Serving Node ascertains whether the reply message 62 includes the above-described broadcast NVSE that indicates this status for the Home Agent. In this illustrative example, where the Home Agent has the requisite capability and has provided the corresponding indication to the Packet Data Serving Node, this determination yields a true result and the Packet Data Serving Node then determines 65, in this example, whether there is an existing relevant context for this Home Agent. (In the event where the Home Agent either does not have the requisite capability and/or is otherwise unwilling to support the shared version broadcast packet handling approach, the Packet Data Serving Node can delete 64 any previously stored or established broadcast Home Agent context.)

When no broadcast context presently exists for the Home Agent, the Packet Data Serving Node can add 66 such a context for this Home Agent to its available stored resources. In any event, the Packet Data Serving Node can then add 67 information regarding the mobile node to a list of broadcast listeners for this particular Home Agent.

The Packet Data Serving Node then transmits a reply message 68 to the mobile node (in this illustrative example, this reply message 68 comprises an MIP_REG_REPLY message wherein the "B" bit is set).

Continuing with this illustrative example, at some future point the Home Agent has a broadcast packet to be distributed. In this case, where the Home Agent and Packet Data Serving Node have negotiated use of the shared version broadcast packet handling method, the Home Agent can provide this broadcast packet 69 (or packets) to the Packet Data Serving Node in the company of, for example, an indication that the Packet Data Serving Node itself comprises the destination. Upon receiving this broadcast packet and determining a need to effect further distribution using the shared version broadcast packet handling method, the Packet Data Serving Node can then replicate 70 the broadcast packet(s) and forward them on to each mobile node as appears in the list as being associated with this Home Agent via its context.

The Packet Data Serving Node can then use this recovered information regarding the mobile node(s) to facilitate transmission of these replicated broadcast packets. For example, as illustrated, the Packet Data Serving Node can transmit a first one of the replicated broadcast packets 71 to the first mobile node mentioned earlier in this example and a second replicated broadcast packet 72 to another mobile node (M1) as has also effected this same kind of registration process.

So configured, those skilled in the art will appreciate that a considerable reduction in Home Agent to Packet Data Serving Node traffic can be expected when these network elements are able to support, and choose to support, such a process, as only a single broadcast packet need to provided by the Home Agent to the Packet Data Serving Node to facilitate provision of that content to a considerably larger number of mobile nodes. At the same time, however, these teachings remain compatible with non-capable elements as existing broadcast packet handling approaches also continue to be supported. The dynamic capabilities described herein provide the opportunity to effect potentially considerable bandwidth savings while also permitting a phased or even partial rollout of such a capability over the elements of a given network.

Those skilled in the art will recognize that a wide variety of modifications, alterations, and combinations can be made with respect to the above described embodiments without departing from the spirit and scope of the invention, and that such modifications, alterations, and combinations are to be viewed as being within the ambit of the inventive concept. For example, in some settings, it may be desirable to provide a third broadcast packet handling approach that differs from either of the first and second approaches, and which third approach serves to accommodate some specific condition of concern.

We claim:

1. A method for operating a Home Agent, the method comprising:
   at the Home Agent, receiving an indication from a first network element that a given mobile node using mobile Internet Protocol should receive subsequent broadcast packets as sourced by the Home Agent;
   at the Home Agent, automatically determining whether to support such subsequent broadcast packets using a first broadcast packet handling approach in which a discrete version of each subsequent broadcast packet is provided by the Home Agent or a second broadcast packet handling approach in which a shared version of each subsequent broadcast packet is provided by the Home Agent to a plurality of mobile nodes; and
   at the Home Agent, determining whether to update a list to indicate whether the first network element supports the second broadcast packet handling approach or supports the first broadcast packet handling approach, wherein the list is stored at the Home Agent and identifies some network elements as supporting the second broadcast packet handling approach and identifies other network elements as supporting the first broadcast packet handling approach and as not supporting the second broadcast packet handling approach.

2. The method of claim 1 wherein said receiving the indication from the first network element that the given mobile node using mobile Internet Protocol should receive subsequent broadcast packets includes:
   receiving a registration request that indicates that subsequent broadcast packets are to be sent to the given mobile node.

3. The method of claim 2 wherein said automatically determining whether to support such subsequent broadcast packets using the first broadcast packet handling approach or the second broadcast packet handling approach includes:
   determining whether the registration request has an indication that the first network element supports the second broadcast packet handling approach.

4. The method of claim 3 wherein said determining whether the registration request has the indication that the first network element supports the second broadcast packet handling approach includes:
   determining whether the registration request has at least one normal vendor specific extension (NVSE) having an indication that the first network element supports the second broadcast packet handling approach.

5. The method of claim 3, further comprising, if the registration request has the indication that the first network element supports the second broadcast packet handling approach, providing an indication to the first network element that the Home Agent is also able to support the second broadcast packet handling approach.

6. The method of claim 3, further comprising, if the registration request has the indication that the first network element supports the second broadcast packet handling approach, including the first network element in the list.

7. The method of claim 6, further comprising:
   associating, in the list, the given mobile node with the first network element if the first network element is determined to support the second broadcast packet handling approach.

8. An apparatus, comprising:
   a Home Agent that includes:
      an interface to a network element;
      a memory;
      a list, stored in the memory of the Home Agent, that indicates whether to use a first broadcast packet handling approach in which a discrete version of a broadcast packet is provided by the Home Agent or a second broadcast packet handling approach in which a shared version of the broadcast packet is provided by the Home Agent to a plurality of mobile nodes if forwarding broadcast packets to a mobile node via the network element, wherein the list identifies some network elements as supporting the second broadcast packet handling approach and identifies other network elements as supporting the first broadcast packet handling approach and as not supporting the second broadcast packet handling approach; and
      a controller operably coupled to the interface to the network element and the list and configured to update the list.

9. The apparatus of claim 8 wherein the list further identifies mobile nodes that are associated with each of the network elements in the list.

10. The apparatus of claim 8 wherein the controller is configured to receive a signal from the network element that indicates that the network element supports the second broadcast packet handling approach.

11. The apparatus of claim 10 wherein the controller is further configured to transmit a signal to the network element that indicates that the Home Agent supports the second broadcast packet handling approach.

12. An apparatus, comprising:
means for receiving, at a Home Agent, an indication from a first network element that a given mobile node using mobile Internet Protocol should receive subsequent broadcast packets as sourced by the Home Agent; and
controller means, at the Home Agent, for determining whether to support such subsequent broadcast packets using a first broadcast packet handling approach in which a discrete version of each subsequent broadcast packet is provided by the Home Agent or a second broadcast packet handling approach in which a shared version of each subsequent broadcast packet is provided by the Home Agent to a plurality of mobile nodes, and for determining whether to update a list to indicate whether the first network element supports the second broadcast packet handling approach or supports the first broadcast packet handling approach,
wherein the list is stored at the Home Agent and identifies some network elements as supporting the second broadcast packet handling approach and identifies other network elements as supporting the first broadcast packet handling approach and as not supporting the second broadcast packet handling approach.

13. The apparatus of claim 12 wherein the list further identifies mobile nodes that are associated with each of the network elements in the list.

14. The apparatus of claim 12 wherein the means for receiving is configured to receive a signal from the first network element that indicates that the first network element supports the second broadcast packet handling approach.

15. The apparatus of claim 12 wherein the controller means controls transmission of a signal to the first network element that indicates that the Home Agent supports the second broadcast packet handling approach.

16. An apparatus, comprising:
a first node that includes:
an interface to a mobile Internet Protocol-compatible wireless mobile node;
an interface to a Home Agent;
a memory;
a list, stored in the memory, that indicates whether to use a first broadcast packet handling approach in which a discrete version of a broadcast packet is received from the Home Agent or a second broadcast packet handling approach in which a shared version of the broadcast packet is received from the Home Agent and to be provided to a plurality of mobile nodes if forwarding broadcast packets from the Home Agent to the mobile node, wherein the list identifies some Home Agents as supporting the second broadcast packet handling approach and identifies other Home Agents as supporting the first broadcast packet handling approach and as not supporting the second broadcast packet handling approach; and
a controller operably coupled to the interface to the mobile node, the interface to the Home Agent, and the list,
wherein the controller is configured to update the list to add the Home Agent if the Home Agent is determined to be capable to support the second broadcast packet handling approach, wherein the first node is configured to receive a first registration request from the mobile node that requests reception of future packets issued by the Home Agent, and wherein in response to the first registration request, the first node is configured to send a second registration request on behalf of the mobile node to the Home Agent to indicate that the first node supports the second broadcast packet handling approach, and
wherein the controller is further configured to remove the Home Agent from the list if the Home Agent is determined to be capable to support the first broadcast packet handling approach and is determined to not be capable to support the second broadcast packet handling approach and if the Home Agent is presently identified in the list.

17. The apparatus of claim 16 wherein the list further identifies mobile nodes that are associated with each of the Home Agents in the list.

18. The apparatus of claim 16 wherein the first node comprises a Packet Data Serving Node.

19. The apparatus of claim 16 wherein the controller is further configured to signal to the Home Agent that the first node supports the second broadcast packet handling approach.

20. The apparatus of claim 19 wherein the controller is further configured to receive a signal from the Home Agent that indicates that the Home Agent supports the second broadcast packet handling approach.

* * * * *